US006227803B1

(12) United States Patent
Shim

(10) Patent No.: US 6,227,803 B1
(45) Date of Patent: May 8, 2001

(54) APPARATUS FOR GENERATING ELECTRIC POWER USING WIND FORCE

(76) Inventor: Hyun Jin Shim, 350-59, Sangdo 3-dong, Dongjak-Ku, Seoul (KR)

( * ) Notice: Subject to any disclaimer, the term of this patent is extended or adjusted under 35 U.S.C. 154(b) by 0 days.

(21) Appl. No.: 09/117,342

(22) PCT Filed: Dec. 1, 1997

(86) PCT No.: PCT/KR97/00252

§ 371 Date: May 10, 1999

§ 102(e) Date: May 10, 1999

(87) PCT Pub. No.: WO98/26177

PCT Pub. Date: Jun. 18, 1998

(30) Foreign Application Priority Data

Nov. 30, 1996 (KR) .................................................. 96-60308

(51) Int. Cl.[7] .................................................. F03D 1/00
(52) U.S. Cl. ................ 416/44; 416/135; 416/170 R; 416/131; 415/3.1; 415/4.3; 415/4.5; 415/7; 415/122.1
(58) Field of Search ............................ 415/2.1, 3.1, 4.3, 415/4.5, 7, 122.1, 123, 908; 416/44, 135, 131, 170 R

(56) References Cited

U.S. PATENT DOCUMENTS

| 623,402 | * | 4/1899 | Hong | 416/44 |
| 1,075,994 | * | 10/1913 | Serramoglia et al. | 416/191 |
| 1,411,126 | * | 3/1922 | Page | 416/169 R |
| 1,633,460 | * | 6/1927 | Slivestrin | 416/150 |
| 4,311,435 | * | 1/1982 | Bergero | 416/170 R |
| 4,517,467 | * | 5/1985 | Fuhring | 290/44 |
| 4,673,822 | * | 6/1987 | Kikuchi | 290/44 |
| 5,226,805 | * | 7/1993 | Proven | 416/132 A |
| 5,854,516 | * | 12/1998 | Shim | 290/53 |

FOREIGN PATENT DOCUMENTS

| 3107252 A1 | * | 9/1982 | (DE) . |
| 37 14 858 | | 11/1988 | (DE) . |
| 1 082 607 | | 12/1954 | (FR) . |
| 213022 | * | 3/1924 | (GB) . |
| 2 039 624 | | 8/1980 | (GB) . |
| 62-265 573 | | 11/1987 | (JP) . |
| 88/10368 | | 12/1988 | (WO) . |
| 94/09272 | | 4/1994 | (WO) . |

* cited by examiner

Primary Examiner—Christopher Verdier
(74) Attorney, Agent, or Firm—D. Peter Hochberg; Katherine R. Vieyra; William H. Holt

(57) ABSTRACT

An apparatus for generating electric power using wind force which is capable of generating good quality electric power by combining the apparatus with the inventor's water wave force-based electric power generating apparatus and installing this combined apparatus in the sea. The apparatus includes a perpendicular fixing support body, a rotary shaft rotatably installed in the fixing support body, a propeller frame rotatably installed in an upper portion of the rotary shaft, a propeller shaft horizontally and rotatably installed in the propeller frame, a propeller member installed in the propeller shaft rotatably in a forward and backward direction, a propeller assembly including a propeller unit assembly having an elastic support arrangement so that the propeller assembly is perpendicularly maintained when the wind velocity is below a predetermined level and the assembly is tilted backward at a predetermined angle when the wind velocity is above a predetermined level, and an electric power generator drivingly connected with a lower portion of the propeller shaft for generating electric power.

5 Claims, 10 Drawing Sheets

APPARATUS FOR GENERATING ELECTRIC POWER USING WIND FORCE

TECHNICAL FIELD

The present invention relates to an apparatus for generating electric power using wind force, and in particular to an improved apparatus for generating electric power using wind force which is capable of operating on the land or in the sea.

BACKGROUND ART

Recently, energy-related problems have become a big issue in international society. Among the problems are air pollution and fossil energy deficiency. In order to overcome these problems, the development of a substitute energy is desperately needed.

The hydroelectric power method has been used as an important method for generating electric power. However, a hydroelectric power plant requires that a very large area of land be flooded, thus reducing the land available for other purposes and damaging natural life systems on the land.

Another substitute energy which is being developed in the industry is nuclear energy. This energy causes some problems such as a nuclear waste disposal, radioactive substances, and other concerns which have become international issues. In addition, in some countries, it is very difficult to prepare an area in which the radioactive waste and substance can be treated, due to unstable processing methods for these materials.

In order to overcome the above-described problems, a technique for using solar energy, which is known as a non-polluting, substitute energy, has been intensely studied. The technique has some problems in that solar energy is more effectively obtained outside the atmospheric orbit; thus, solar energy is more effectively used in a space station or a satellite. However, within the earth's atmospheric orbit, since the amount of solar energy varies in accordance with the weather conditions, solar energy's use for home heating systems is limited.

In addition, a tidal power plant method has been developed, which is directed to using the ebb and flow difference of the tide. However, this method is limited in application to specific places where a predetermined amount of ebb and flow difference of the tide can be obtained.

Another technique, basically directed to using the force of water waves, has been developed as a water wave force-based electric power generating apparatus and a method for creating such. In connection with this technique, there are Korean Patent No. 35,913 (corresponding to U.S. Pat. No. 5,066,867) and Korean Patent No. 96-11790, which improves upon Korean Patent No. 35,913.

This water wave-based electric power generating apparatus is directed to converting the force generated as buoys move up and down on the waves into a rotational force, which is used for driving an electric power generator. Since at least 1 m waves are always generated in the sea, it is possible to build a power plant to generate the desired electric power using this water wave-based electric power generating apparatus. In addition, this power plant is installed in the sea which occupies 78% of the earth's surface providing almost unlimited area for installing the power plant containing the water wave-based electric power generating apparatus.

Another technique for overcoming the above-described problems is a wind power generator. However, the wind power generator requires a steady, strong wind. Therefore, there is a problem in consistently obtaining the necessary wind.

In the conventional wind power generator, a plurality of propellers are fixed at predetermined angles, respectively, for effectively receiving the wind. Therefore, it is impossible to use the wind to generate power when the wind velocity is below a predetermined level, for example, 20 m per second. Conversely, if the wind velocity exceeds 60 m per second, the high force of the wind may break the propellers.

DISCLOSURE OF THE INVENTION

Accordingly, it is an object of the present invention to provide an apparatus for generating electric power using wind force which overcomes the aforementioned problems encountered in the background art.

It is another object of the present invention to provide an apparatus for generating electric power using wind force which is capable of increasing electric power generating efficiency by responding to numerous wind variations since the direction of the propellers is changed when a predetermined wind velocity, which exceeds a predetermined level, is applied to the apparatus.

It is another object of the present invention to provide an apparatus for generating electric power using wind force which is capable of generating a good quality of electric power by combining the apparatus with the inventor's water wave force-based electric power generating apparatus by installing the apparatus in the sea.

To achieve the above objects, there is provided an apparatus for generating electric power using wind force which includes a perpendicular fixing support body, a rotary shaft rotatably installed in the fixing support body, a propeller frame rotatably installed in an upper portion of the rotary shaft, a propeller shaft horizontally and rotatably installed in the propeller frame, a propeller member installed in the propeller shaft rotatably in a forward and backward direction, a propeller assembly including a propeller unit assembly having an elastic support means so that the propeller assembly is perpendicularly maintained when the wind velocity is below a predetermined level and the assembly is tilted backward at a predetermined angle when the wind velocity is above a predetermined level, and a power generator drivingly connected with another end portion of the propeller shaft for generating electric power.

Additional advantages, objects and features of the invention will become more apparent from the description which follows.

BRIEF DESCRIPTION OF THE DRAWINGS

The present invention will become more fully understood from the detailed description given herein and the accompanying drawings which are given by way of illustration only, and thus do not limit the present invention.

FIGS. 1 through 6 are views illustrating an apparatus for generating electric power using wind force according to a first embodiment of the present invention, of which:

FIG. 1 is a rear view illustrating an apparatus for generating electric power using wind force;

FIG. 2 is a side view of FIG. 1;

FIG. 3 is a partially enlarged cross-sectional view of FIG. 2;

FIG. 4 is a side view illustrating a profile of a propeller;

FIG. 5 is a cross-sectional view taken along line V—V of FIG. 4; and

FIG. 6 is a partially enlarged view illustrating a variable operational state of a propeller according to the present invention.

FIGS. 7 and 8 are views illustrating an apparatus for generating electric power using wind force according to a second embodiment of the present invention, of which:

FIG. 7 is a perspective view illustrating an apparatus for generating electric power using wind force; and FIG. 8 is a front view of FIG. 7.

FIGS. 9 through 11 are views illustrating an apparatus for generating electric force using wind force according to a third embodiment of the present invention, of which:

FIG. 9 is a perspective view illustrating an apparatus for generating electric power using wind force;

FIG. 10 is a front view of FIG. 9; and

FIG. 11 is a side view of FIG. 10.

MODES FOR CARRYING OUT THE PREFERRED EMBODIMENTS

The apparatus for generating electric power using wind force according to the present invention will now be explained with reference to the accompanying drawings.

Figure 1:
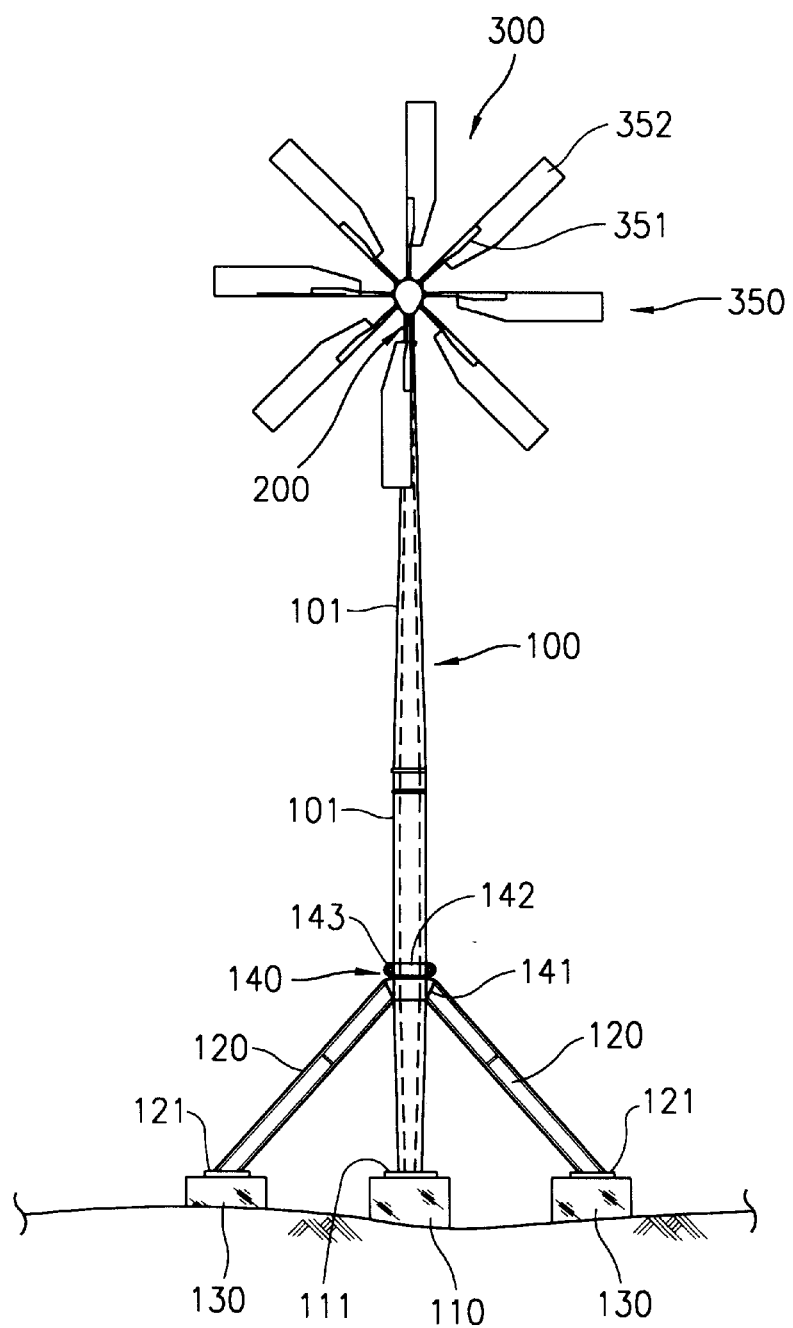

FIG. 1 illustrates an apparatus for generating electric power using wind force according to a first embodiment of the present invention, which is installed on the land.

Figure 3:
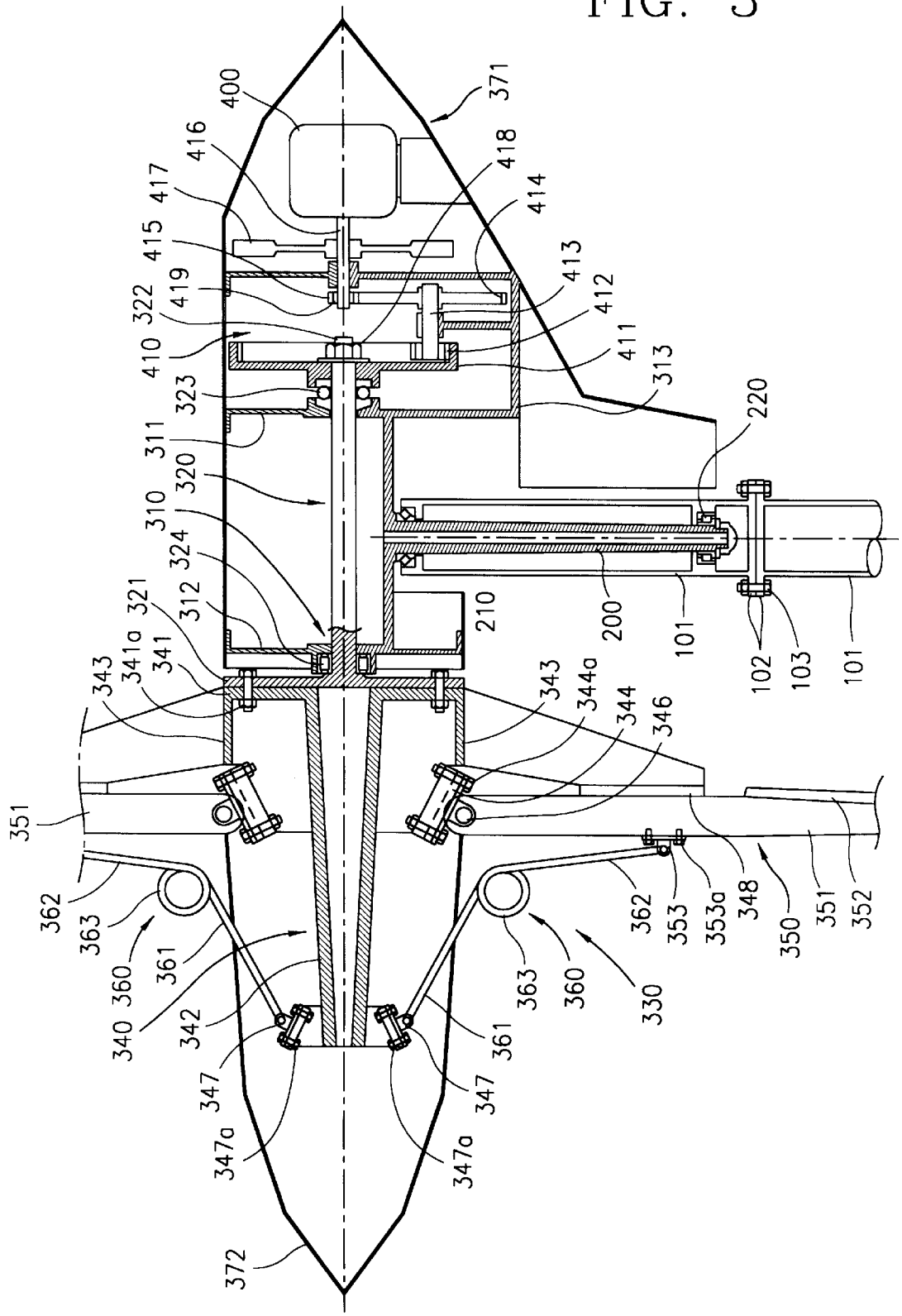

In the embodiment shown in FIG. 1, there is a fixing support body 100 installed on the ground, a rotary shaft 200, shown in FIG. 3, rotatably installed on a top portion of the fixing support body 100, a propeller assembly 300 rotatably engaged with the rotary shaft 200 for generating a rotational force upon receiving the wind, and an electric power generator 400, shown in FIG. 3, operable in accordance with the rotational force generated by the propeller assembly 300 for generating electric power.

The fixing support body 100 is perpendicularly installed on a base block 110. The fixing support body 100 may be installed without supports if it can endure the wind and other forces. In the present embodiment, the fixing support body 100 is held stable and supported by a plurality of supports 120.

The lower portions of the supports 120 are fixed by a plurality of sub-base blocks 130 installed around the base block 110 (in the drawings, two sub-base blocks are shown; but, actually there are three sub-base blocks), and the upper portion of each support 120 is fixedly connected with the intermediate portion of the fixing support body 100.

The base blocks 110 and sub-base blocks 130 are installed on the ground by a method known in the art, and the fixing support body 100 and the supports 120 are installed by installing each support 120 on a concrete sub-base block 130. Specifically, anchor plates 111 and 121 are fixed to the lower portions of the fixing support body 100 and the supports 120, respectively, and anchor bolts (not shown) installed in the base blocks 110 and sub-base blocks 130 pass through the anchor plates 111 and 121 and then upwardly extended therefrom, and nuts are engaged to the protruded portions of the anchor plates 111 and 121, so that the fixing support body 100 and the supports 120 are fixed to the base 110 and the sub-base blocks 130.

Here the method for installing the fixing support body 100 and the supports 120 to the base 110 and the sub-base blocks 130 is not limited to the above-described method. Any method may be used for this purpose.

The fixing support body 100 may be made of a hollow member so that a cable (not shown) for transferring electric power generating by the electric power generator 400 to a central controller (not shown) is installed through the hollow member, and the supports 120 may be made of a predetermined shaped steel such as an H-shaped beam, an angle beam, etc.

The fixing support body 100 is supported by the supports 120 by inserting a connection member 140 onto the intermediate portion of the fixing support body 100 and engaging the upper portion of the supports 120 to the connection protrusion 141 using bolts and nuts (not shown). In addition, since the connection member 140 includes a fixing portion 142 inserted onto the fixing support body 100, the connection member 140 is fixed to the fixing support body 100 by tightening screws 143.

Here the connection method for connecting the fixing support body 100 and the supports 120 are not limited to bolts and nuts. Any method for tightly fixing the fixing support body 100 to the supports 120 may be used for this purpose.

The fixing support body 100 may be formed with a single member. More preferably, the fixing support body 100 is divided into a plurality of members 101, shown in FIGS. 1 and 3, in accordance with the height thereof, and these members 101 are preferably connected using the bolts 102 and nuts 103.

As shown in FIG. 3, the rotary shaft 200 is rotatably supported in its upper and lower portions by bearings 210 and 220 installed in the fixing support body 100. Here, for the bearing 210 installed in the upper portion, a taper roller bearing is preferably used for the rotation of the rotary shaft 200 and supporting the weight of the thrust, and for the bearing 220 installed in the lower portion, a cylindrical roller bearing is preferably used for implementing the rotation of the rotary shaft 200.

In addition, the rotary shaft 200 is made of a hollow shaft, shown in FIG. 3, for facilitating the cable (not shown) to be installed in it for transferring the electric power generated by the electric power generator 400 to the central controller (not shown).

The propeller assembly 300 includes a propeller frame 310 integrally rotatable with the rotary shaft 200, a propeller shaft 320 which is rotatable with respect to the propeller frame 310, and a propeller unit assembly 330 installed in an upper portion of the propeller shaft 320.

The propeller frame 310, shown in FIG. 3, is integrally made of an engineering plastic in order to decrease the weight of the apparatus and made in a fabrication line by separately fabricating the propeller frame 310 from the rotary shaft 200.

In addition, shown in FIG. 3, the propeller frame 310 includes a pair of support plate portions 311 and 312 for supporting the propeller shaft 320, and the propeller shaft 320 is rotatably connected to the support plate portions 311 and 312 by a pair of bearings 323 and 324, respectively.

A transmission housing portion 313 is formed in the propeller frame 310 for installing the transmission unit 410 which will be explained later.

As shown in FIG. 3, for the bearing 323 which is installed at a front portion of the propeller shaft 320, a ball bearing is used for a desired rotation of the propeller shaft 320, and for the bearing 324 which is installed at a rear portion, a cylindrical roller bearing is used for supporting the weight which is applied during the operation of the apparatus.

In addition, the propeller shaft 320, shown in FIG. 3, includes a flange portion 321 for engaging the propeller unit assembly 330 to the rear portion, and a threaded portion 322 for engaging the transmission unit 410 to the end portion.

The propeller unit assembly 330, shown in FIG. 3, includes a rotary member 340 engaged to a rear portion of the propeller shaft 320, a plurality of propeller members 350 (in FIGS. 1 and 5, eight members are shown) which are forwardly and rearwardly rotatable and are supported at the inner and outer portions of the rotary member 340, and an elastic support member for elastically supporting the propeller member 350 in the forward direction.

The rotary shaft 340 includes a flange portion 341 engaged to the flange portion 321 of the propeller shaft 320, a shaft portion 342 (shown in FIGS. 4 and 6) rearwardly extended from the center portion of the flange portion 341, and a plurality of propeller support plates 343 (in FIGS. 1 and 5, eight plates, identical to the number of propellers, are shown) formed on an outer circumferential intermediate portion of the shaft portion 342.

Figure 5:
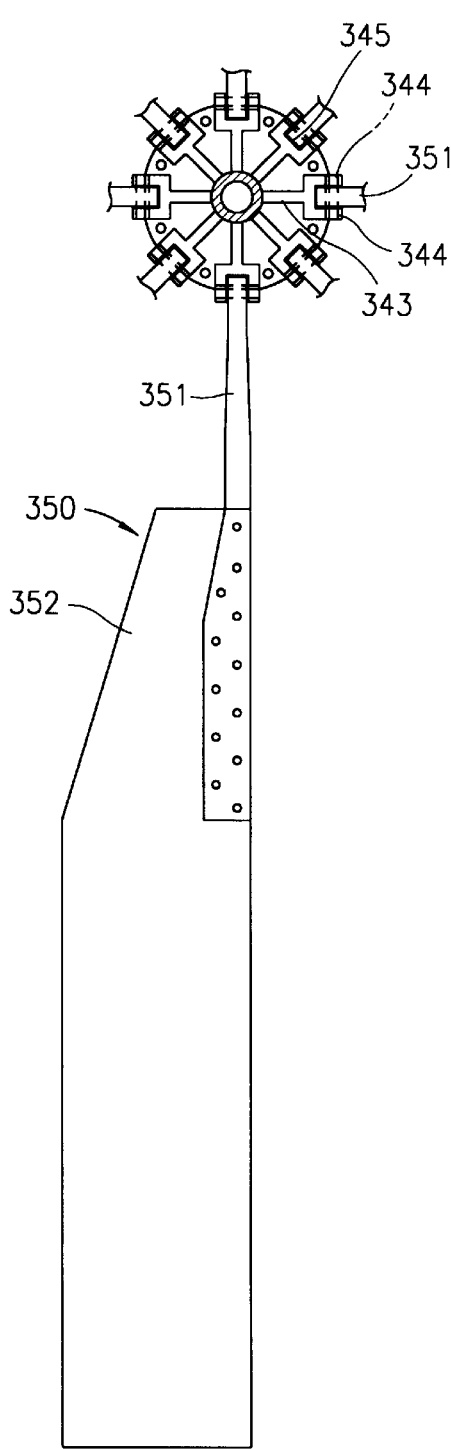

As shown in FIG. 5, the propeller support plates 343 are formed radially with respect to the axis line, and a pair of hinge plates 344 having a propeller support groove 345 are formed on the end portion thereof.

The hinge plates 344 may be made separately from the propeller support plate 343 and then may be engaged using the screw 344a, shown in FIG. 3. In another embodiment, the hinge plates 344 may be made integrally with the propeller support plate 343.

A stopper or spring engaging portion 347 is formed in the propeller support plate 343 in order to prevent an over rotation by which the propeller member 350 is positioned at a right angle with respect to the propeller shaft 320 in the forward direction.

The propeller member 350 includes propeller connection rods 351 which are hinged at the end portion of the propeller support plate 343 rotatably in the front or rear directions and radially extended therefrom, and a propeller plate 352 threadedly engaged with the propeller connection rod 351.

In order to rotatably hinge the inner portion of the propeller connection rod 351 to the end portion of the propeller support plate 343, the inner portion of the propeller connection rod 351 is inserted into the propeller support groove portion 345 formed on the portion of the propeller support plate 343, and the hinge pin 346 passes through the hinge plate 344 and the propeller connection rod 351.

Figure 4:
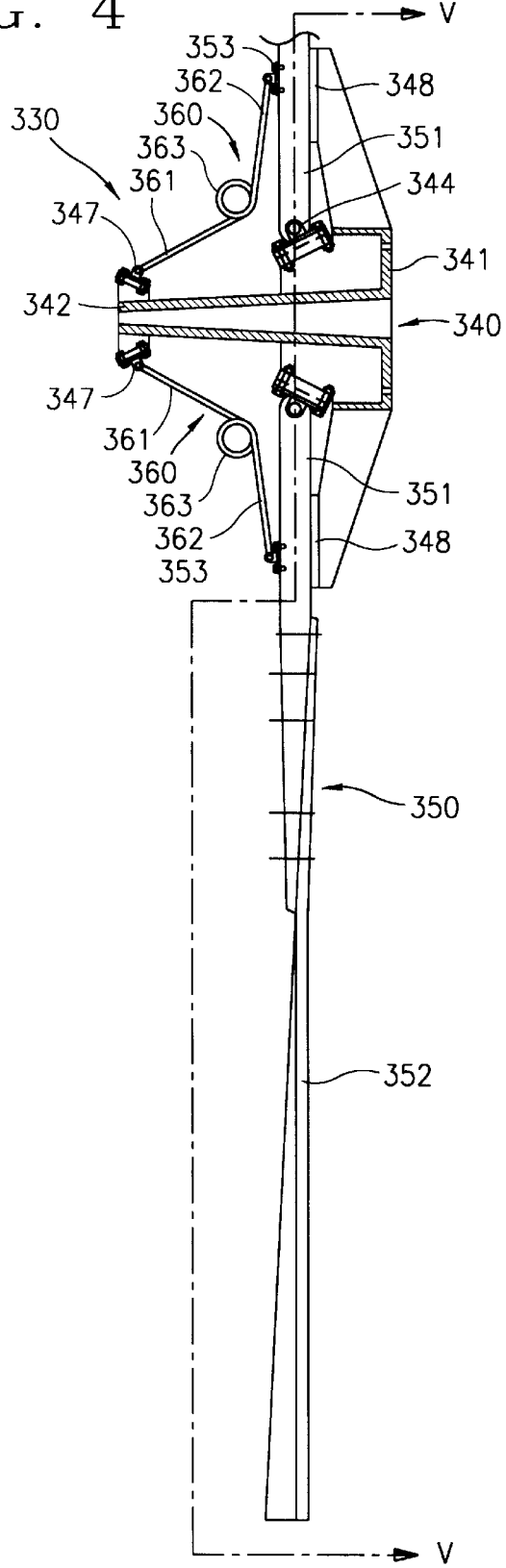

As shown in FIGS. 3 and 4, the elastic support member includes a spring engaging portion 347 formed on an end portion of the shaft portion 342 of the rotary member 340, and a torsion spring 360 having arms 361 and 362 engaged to the spring engaging portions 347 and 353, respectively, installed in the propeller connection rod 351.

The torsion spring 360 is installed by winding the turn portion 363 to the hinge pin 346 hinged to the hinge plate 344 of the support plate 343 with respect to the propeller connection rod 351, and the end portions of the arms 361 and 362 may elastically support the spring engaging portions 347 and 353, respectively. A desired elastic support is not implemented if the arms 361 and 362 are escaped from the spring engaging portions 347 and 353, respectively. Therefore, the arms 361 and 362 are engaged to the spring engaging portions 347 and 353 so that the turn portion 363 is movable from its position.

The spring engaging portions 347 and 353 may be fabricated independently from the propeller support plate 343 and the screws 347a and 353a, or they may be fabricated integrally with the propeller support plate 343 and the propeller connection rod 351.

The electric power generator 400, shown in FIG. 3, is installed in the end portion of the propeller shaft 320 through the transmission unit 410.

The transmission unit 410 includes a ring gear 411 installed in the transmission housing portion 313 formed integrally with the end portion of the propeller frame 310 and fixed to the rear portion of the propeller shaft 320, a planet gear 412 intermeshed with the inner portion circumferential surface of the ring gear 411, a large diameter gear 414 coaxially fixed with the planet gear 412, a small diameter gear 415 intermeshed with the large diameter gear 414, and an output shaft 416 fixed to the small diameter gear 415.

The ring gear 411 is fixedly installed in the propeller shaft 320 by passing through the threaded portion 322 formed on the rear portion of the propeller shaft 320 into the center portion thereof and by engaging the nuts 418 to the threaded portion 322, and the planet gear 412 and the large diameter gear 414 are coaxially fixed to both ends of the driving shaft 413, and the output shaft 416 is rotatably supported by the transmission housing portion 313.

The output shaft 416 is installed integrally with the shaft of the electric power generator 400, and the small diameter gear 415 and the output shaft 416 are connected with a one way clutch bearing 419. The one way clutch bearing 419 is used for transferring the rotational force of the small diameter gear 415 to the output shaft 416 when wind is blown in the normal direction. When the propeller unit assembly 330 is reversely rotated by a sudden reverse wind, the small diameter gear 415 is slipped with respect to the output shaft 416, so that the rotational force is not transferred to the output shaft 416, and thus the output shaft 416 is always rotated in a predetermined direction (normal direction).

In addition, a flywheel 417 is installed in the output shaft 416, so that the rotation of the output shaft 416 is properly implemented by the inertia force.

For the electric power generator 400, a direct current generator is used. The electric power generated in this fashion is transferred to the battery (not shown) installed in the central controller (not shown) through the cable (not shown) passing through the interior of the rotary shaft 200 and the fixing support body 100.

Figure 2:
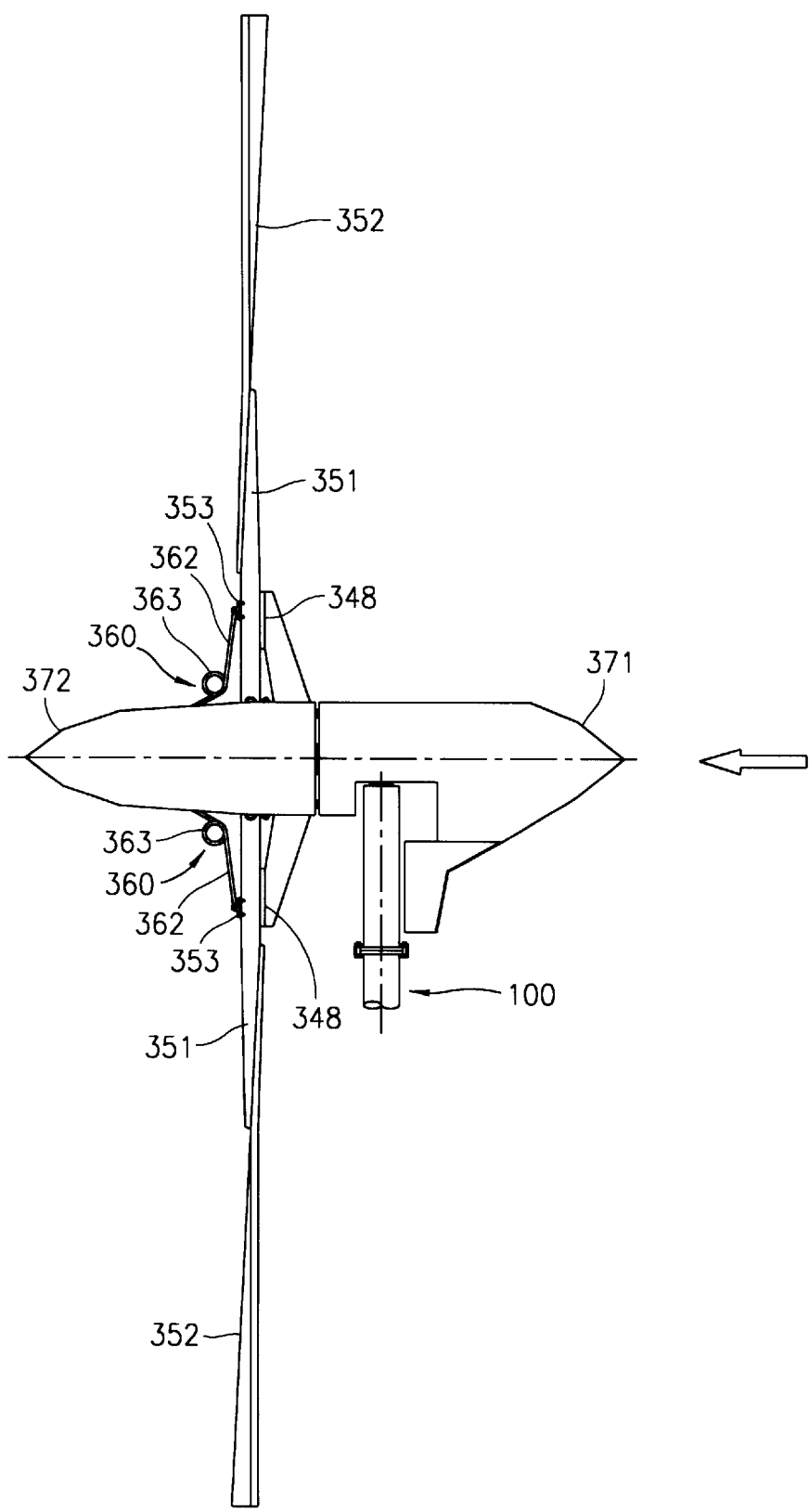

As shown in FIGS. 2 and 3, the propeller assembly 300 is covered by the front and rear side covers 371 and 372 for preventing dust or foreign materials from being transferred into it. The covers 371 and 372 are formed in a streamline shape for minimizing the wind resistance.

In addition, the electric power generator 400 is installed in the front cover 371. More preferably, an electric power generator mount may be formed in the propeller frame 310 for mounting the electric power generator 400 thereon.

The apparatus for generating electric power using wind force may be installed as one independent structure. More preferably, a plurality of apparatuses may be installed for generating a large amount of electric power by connecting them in parallel.

The operation for generating electric power will now be explained with reference to the accompanying drawings.

When wind blows from the right-hand direction as shown in the drawings, in a state that the apparatus for generating electric power using wind force is installed as shown in FIG. 1, the propeller member 350 is rotated by the wind force, and then the rotary member 340 connected with the propeller member 350 is rotated.

The rotational force of the rotary member 340 is transferred to the propeller shaft 320 through the end portion flange portion 341 of the rotary member 340 and the flange portion 321 connected with the end portion flange portion 341, thus rotating the propeller shaft 320.

When the propeller shaft 320 is rotated, both of its ends are supported by the propeller frame 310 and its bearings 323 and 324. Since the forward bearing 323 is made of a ball bearing, and the rear bearing 324 is made of a cylindrical roller bearing, the propeller shaft 320 is designed to be rotatable and to endure the wind force.

The rotational force of the propeller shaft 320 is transferred to the ring gear 411 of the transmission unit 410 connected with the threaded portion 322 by the nuts 418, and the rotational force is initially increased while it is being transferred to the planet gear 412 intermeshed with the ring gear 411. Therefore, the large diameter gear 414 coaxially installed in the planet gear 412 by the driving shaft 413 is rotated, and the rotational force is secondarily increased while the small diameter gear 415 intermeshed with the large diameter gear 414 is being rotated, and then this force is transferred to the output shaft 416 connected with the small diameter gear 415.

Therefore, the output shaft 416 is rotated, and the electric power generator 400 is driven, thus generating electric power.

At this time, since the flywheel 417 is installed in the output shaft 416, it is possible to implement a continuous rotation by the inertia force of the flywheel 417.

When the wind blows in the opposite direction, a rotational moment is generated with respect to the vertical shaft by the wind force. The entire propeller assembly 300 is rotated by the rotational moment generated with respect to the rotary shaft 200. Therefore, the central axial line of the propeller unit assembly 330 always coincides with the direction of the wind.

While the rotary shaft 200 is being rotated, it is supported by the upper and lower side bearings 210 and 220 with respect to the fixing support body 100, and for the upper bearing 210, the taper roller bearing is used. In addition, for the lower bearing 220, since the cylindrical roller bearing is used, the weight of the propeller assembly 300 is effectively supported thereby, and the rotation of the rotary shaft 200 is properly implemented.

When the direction of wind is suddenly changed, the propeller member 350 may be reversely rotated since the above-described rotational operation of the rotary shaft 200 is not implemented; instead, a slip occurs in the bearing 419 between the small diameter gear 415 and the output shaft 416. Therefore, the rotational force of the small diameter gear 415 is not transferred. The output shaft 416 is normally rotated by the inertia force of the flywheel 417 in the normal rotation mode.

In addition, in the propeller member 350, the propeller connection rod 351 is always made perpendicular with respect to the propeller shaft 320 since the propeller connection rod 351 is engaged with the stopper 347, so that the rotation force generation efficiency of the propeller member 350 which is rotated by the wind force is maximized.

Here the elastic support member is used for maximizing the efficiency of the rotational force of the propeller member 350 when the wind velocity is less than 20 m/sec, and if the wind velocity exceeds a predetermined speed, for example, 20 m/sec, the wind force overcomes the elastic force of the elastic support member, so that the propeller member 350 is tilted backward with respect to the hinge pin 346, thus decreasing the wind force applied to the propeller member 350 and the propeller assembly 300.

Figure 6:
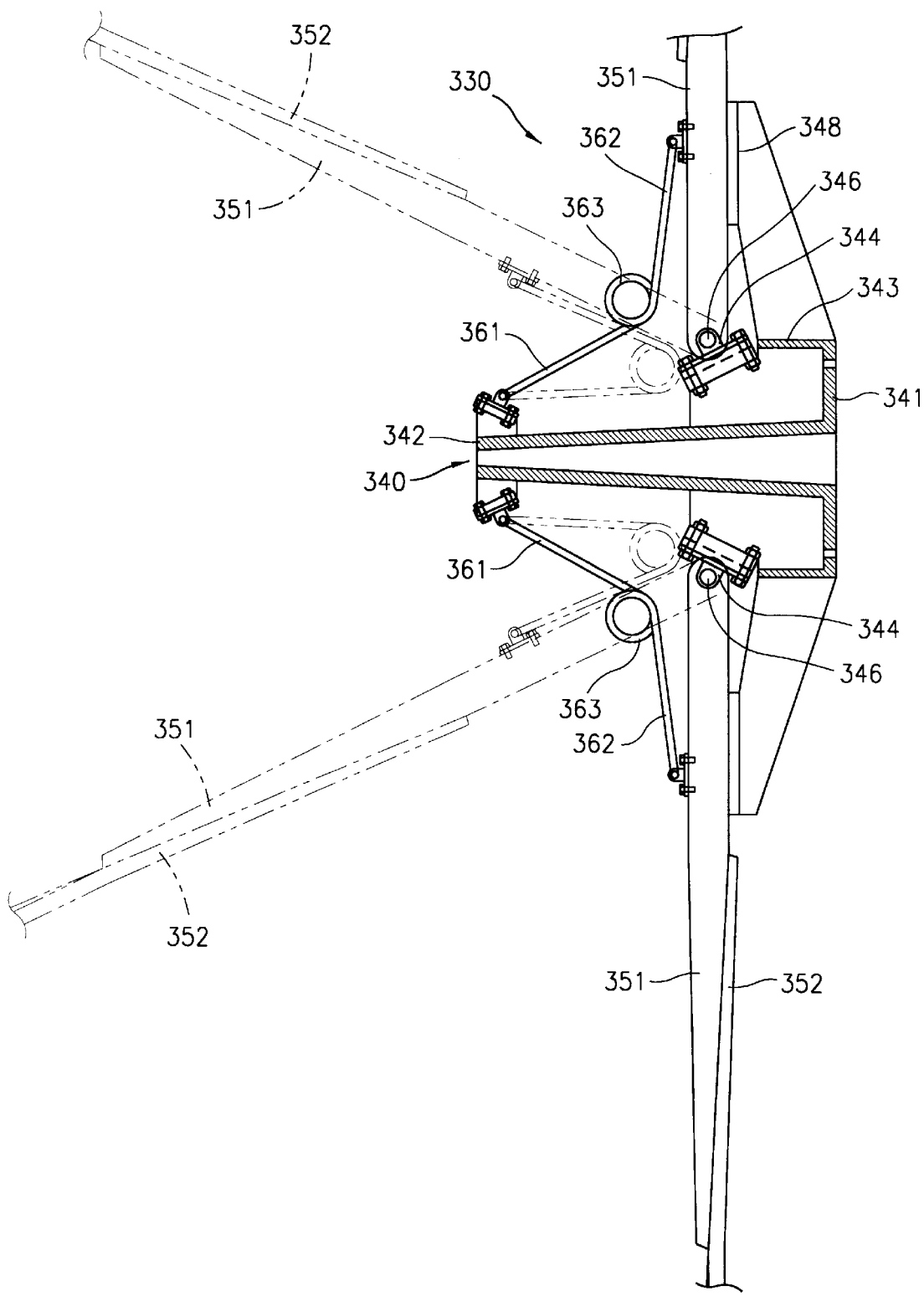

As shown in FIG. 6, the broken line (virtual line) denotes a state in which the propeller member 350 is fully tilted backward when the wind velocity exceeds 60 m/sec.

In the state that the propeller member 350 is tilted backward by the wind force, the force applied to the propeller member 350 is decreased by the tilted angle of the propeller member 350; however, since the rotational force is continuously applied to the propeller member 350, it is possible to continuously generate electric power.

In the torsion spring 360 of the elastic support member, since the arm 361 is fixed to the spring engaging portion 347 of the rotation member 340 and the arm 362 is fixed to the spring engaging portion 353 also connected to the rotation member 340 of the propeller unit connection rod 351, and the turn portion 363 is freely positioned in a predetermined portion, the spring is not escaped, i.e. set free, even if the propeller member 350 is suddenly rotated.

In the state that the propeller member 350 is fully tilted backward by the wind force, when the wind velocity is decreased below a predetermined level, the propeller member 350 is returned to the original position by the operation of the elastic support member, as shown by the full line in FIG. 6.

In addition, the direct current generated by the electric power generator 400 is charged into the battery of the central controller and is transferred to a predetermined element after a few processes.

Figure 7:
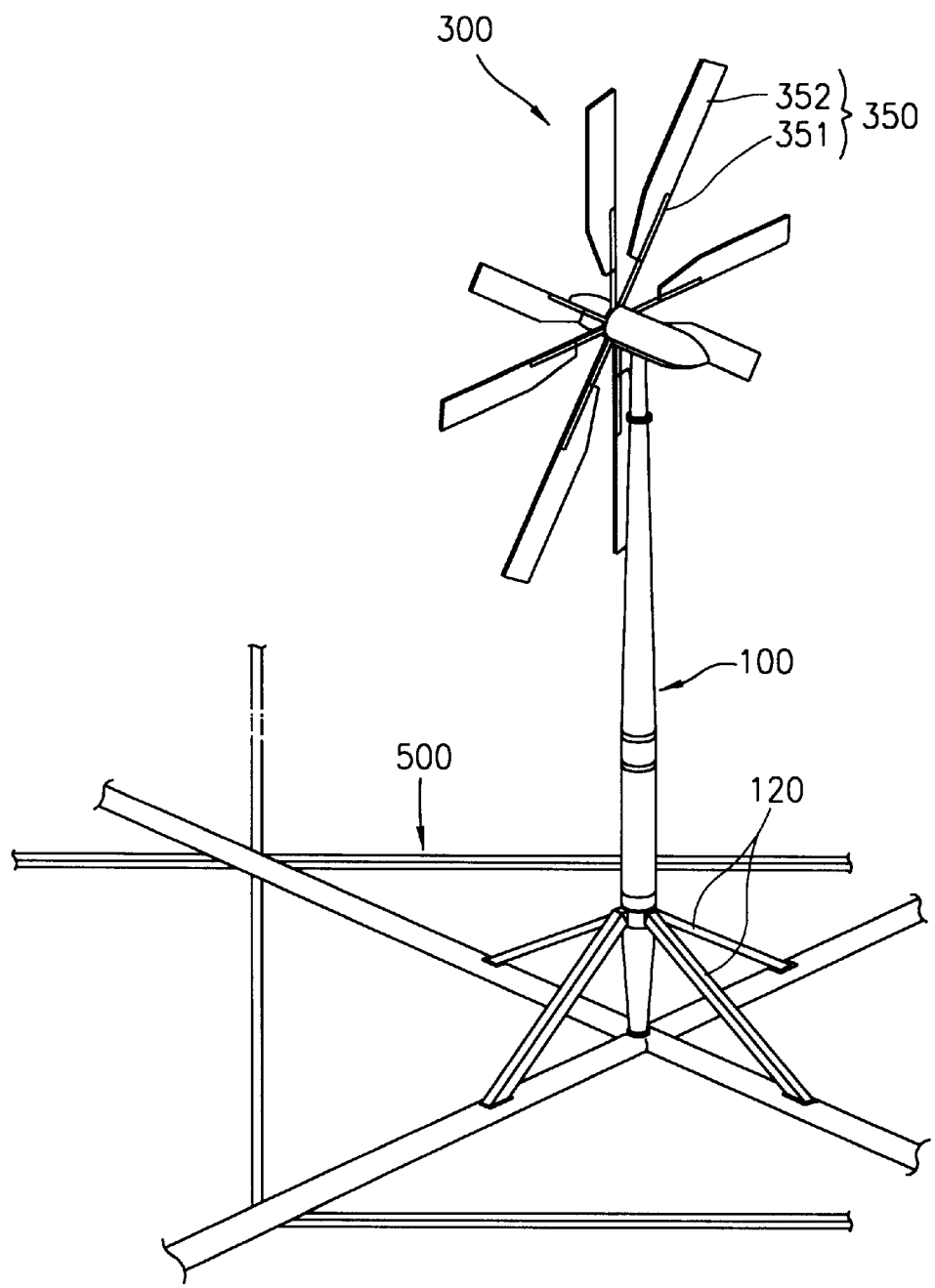
Figure 8:
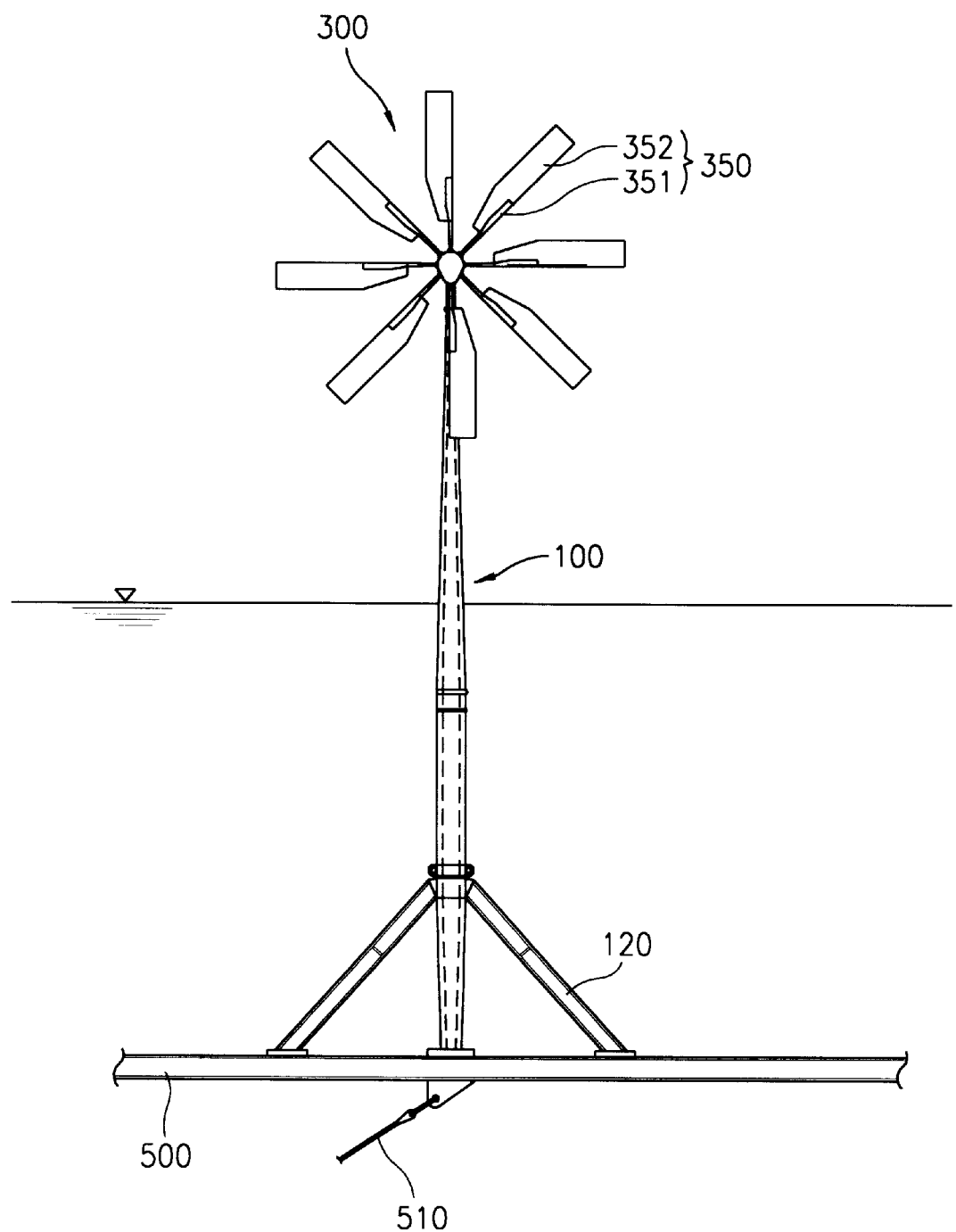

FIGS. 7 and 8 illustrate the apparatus for generating electric power using wind force which is installed in the sea in accordance with a second embodiment of the present invention.

As shown therein, the rotary shaft 200 is rotatably installed in the fixing support body 100 which is installed on the lattice frame 500 installed in a buoy which is submerged in the sea and is connected with an anchor block (not shown) installed in the bottom surface under the sea and connected with the anchor wire 510. Thereafter, the propeller assembly 300 is installed on the rotary shaft 200, shown in FIG. 3, so that it is possible to generate electric power using wind force in the sea. In this case, since the apparatus is installed in the sea, the place for installing the apparatus is not as limited as it would be if installing on the land. Since the constructions of the rotary shaft 200, the propeller assembly 300 and the electric power generator 400, shown in FIG. 3, are identical with the construction of the apparatus according to a first embodiment of the present invention, the identical elements are given the same numerals.

Figure 9:
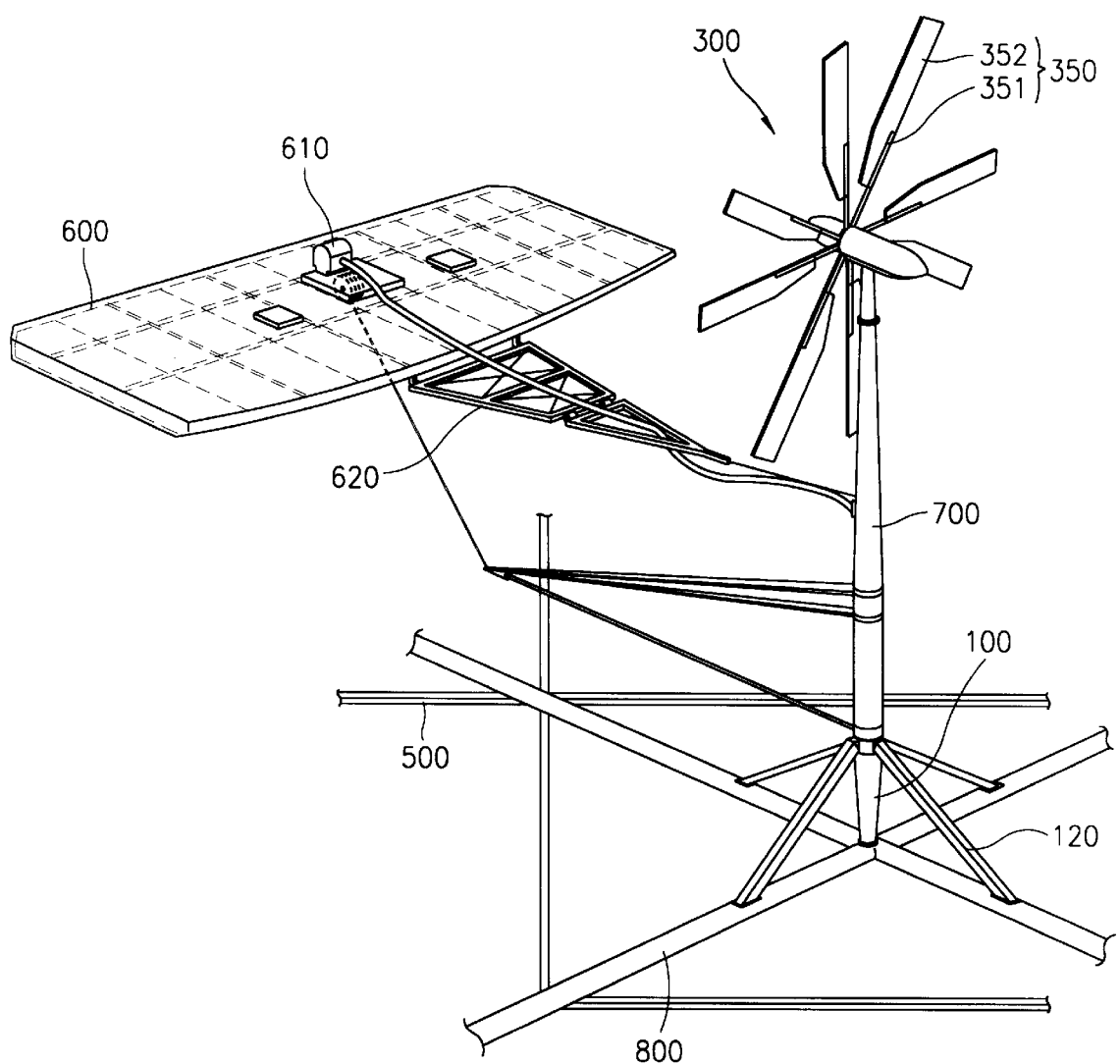
Figure 10:
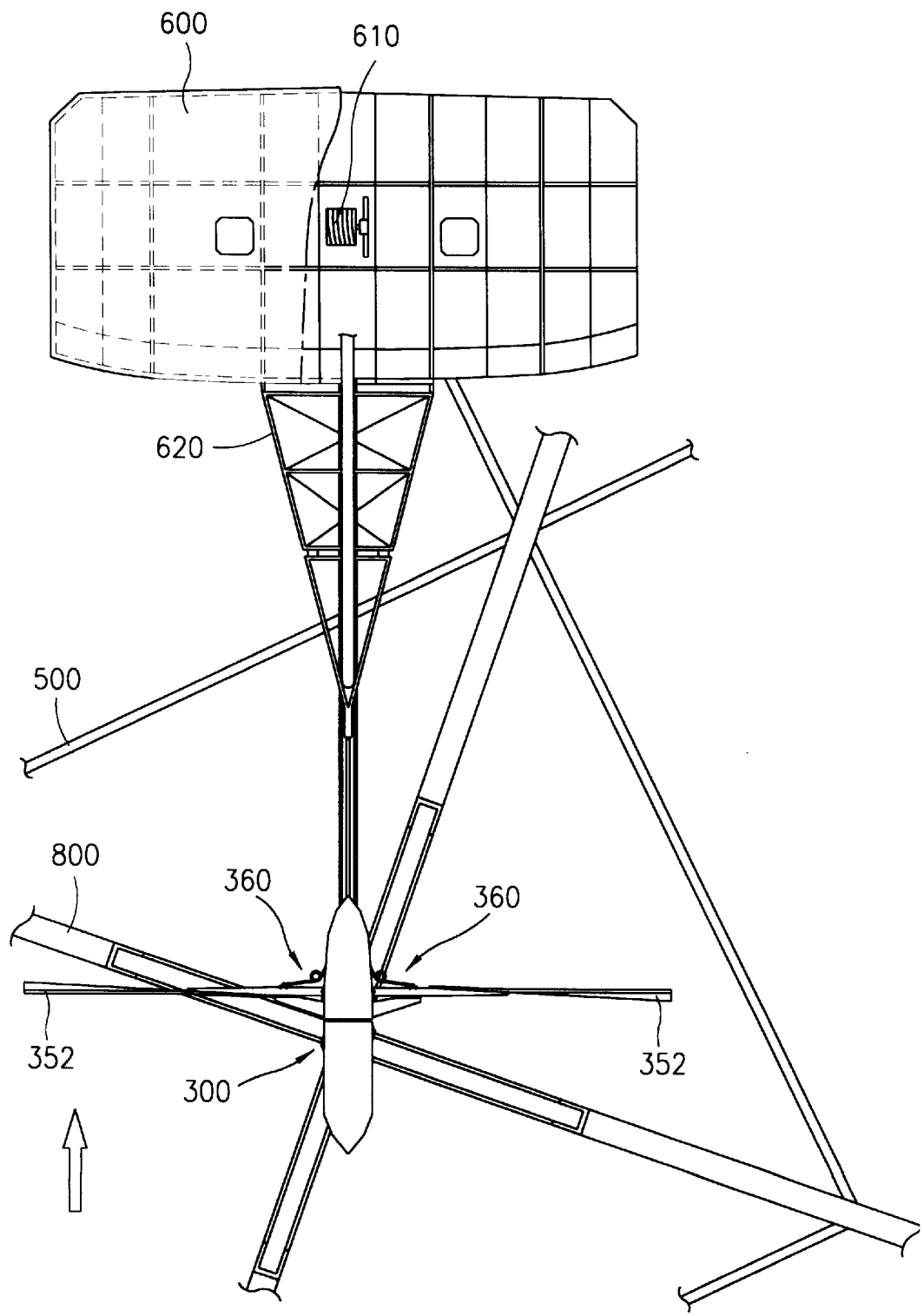
Figure 11:
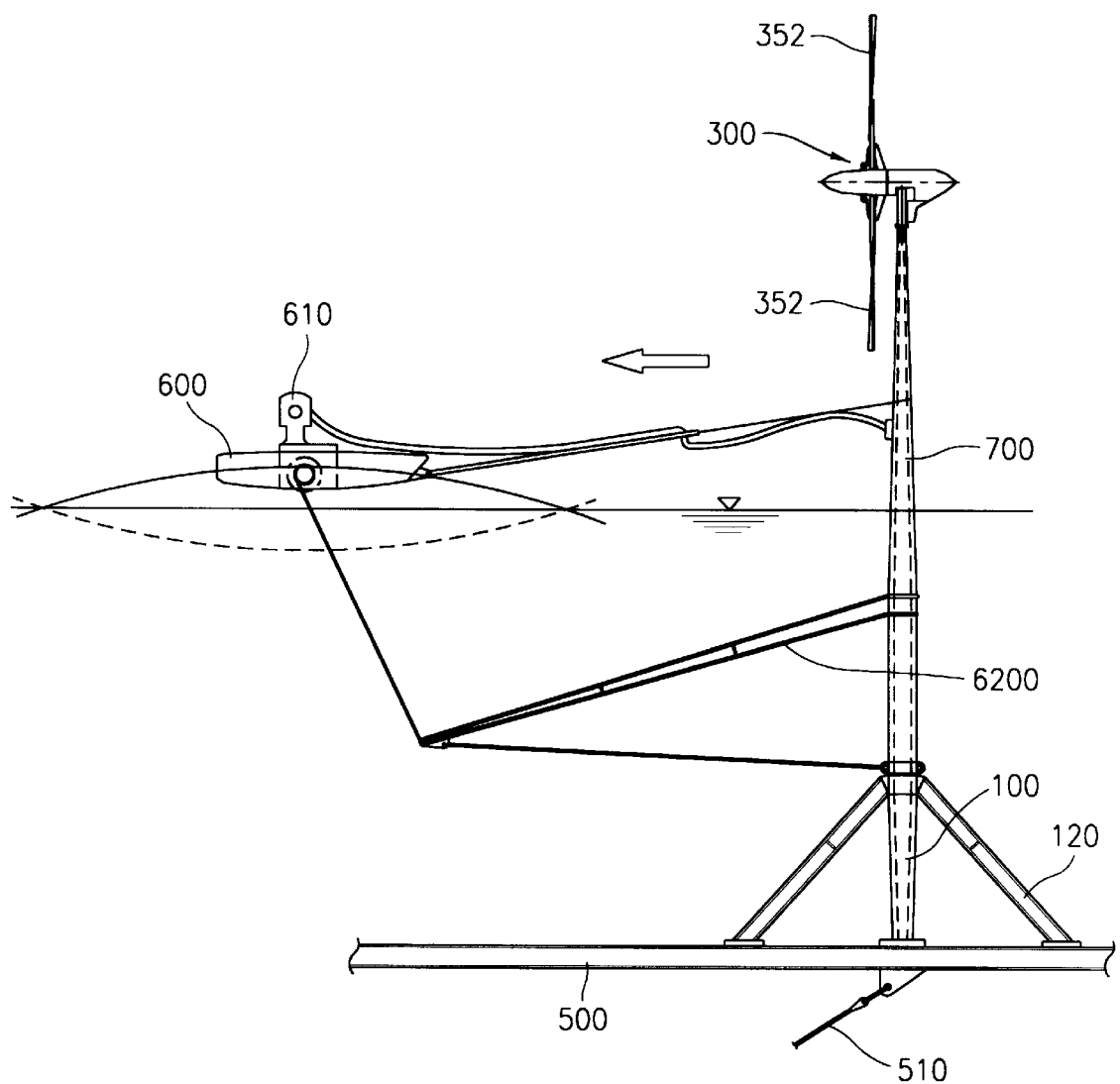

FIGS. 9 through 11 illustrate an apparatus for generating electric power using wind force which is adapted to the apparatus of Korea Patent Application No. 96-11790, so that it is possible to more effectively generate electric power using the apparatus for generating electric power using a wind force according to the present invention.

In this embodiment, shown in FIGS. 9, 10 and 11, the rotary shaft 200 is installed on the buoy rotation shaft 700 which rotatably supports the buoy 600. This buoy rotation shaft 700 connects to the fixing support body 100 installed on the lattice frame 500 submerged in the sea like the embodiment in FIGS. 7 and 8. Since the construction of the embodiment in FIGS. 9 through 11 is the same as the embodiment in FIGS. 7 and 8, the description thereof will be omitted.

In FIGS. 9 through 11, reference numeral 610 denotes a pump installed in a buoy, 620 denotes a support member supporting the buoy 600 to be upwardly and downwardly moved, 800 denotes a pressure liquid transfer tube for transferring a pressure liquid generated by pump 610.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for generating electric power using wind force, comprising:

a perpendicular fixing support body;

a rotary shaft rotatable installed in the fixing support body;

a propeller frame rotatably installed in an upper portion of the rotary shaft;

a propeller shaft horizontally and rotatably installed in the propeller frame;

a propeller member installed in the propeller shaft rotatably in a forward and backward direction;

a propeller assembly including a propeller unit assembly having an elastic support means so that the propeller assembly is perpendicularly maintained when the wind velocity is below a predetermined level and the propeller assembly is tilted backward at a predetermined angle when the wind velocity is above a predetermined level;

an electric power generator drivingly connected with a lower portion of the propeller shaft for generating electric power; and in said propeller unit assembly, a rotary member is fixed to one end of the propeller shaft, and the propeller assembly is rotatably hinged to a propeller assembly support plate formed in the rotary member, movably in the forward and backward directions.

2. An apparatus for generating electric power using wind force, comprising:

a perpendicular fixing support body;

a rotary shaft rotatably installed in the fixing support body;

a propeller frame rotatably installed in an upper portion of the rotary shaft;

a propeller shaft horizontally and rotatable installed in the propeller frame;

a propeller member installed in the propeller shaft rotatable in a forward and backward direction;

a propeller assembly including a propeller unit assembly having an elastic support means so that the propeller assembly is perpendicularly maintained when the wind velocity is below a predetermined level and the propeller assembly is tilted backward at a predetermined angle when the wind velocity is above a predetermined level, a propeller support plate, and a propeller connection rod rotatably supported by the propeller support plate in the forward and backward directions, and a propeller plate attached to the propeller connection rod; and an electric power generator drivingly connected with a lower portion of the propeller shaft for generating electric power.

3. An apparatus for generating electric power using wind force, comprising:

a perpendicular fixing support body;

a rotary shaft rotatably installed in the fixing support body;

a propeller frame rotatably installed in an upper portion of the rotary shaft;

a propeller shaft horizontally and rotatably installed in the propeller frame;

a propeller member installed in the propeller shaft rotatably in a forward and backward direction;

a propeller assembly including a propeller unit assembly having an elastic support means so that the propeller assembly is perpendicularly maintained when the wind velocity is below a predetermined level and the propeller assembly is tilted backward at a predetermined angle when the wind velocity is above a predetermined level;

an electric power generator drivingly connected with a lower portion of the propeller shaft for generating electric power;

a transmission unit installed between the propeller shaft and the electric power generator, wherein said transmission unit includes;

a ring gear fixed to the propeller shaft;

a planet gear intermeshed with the inner circumferential surface of the ring gear;

a large diameter gear coaxially connected with the planet gear;

a small diameter gear intermeshed with the large diameter gear; and an output shaft fixed to the small diameter gear and coaxially connected with the electric power generator.

4. The apparatus of claim 3, wherein a one way clutch bearing is installed between the small diameter gear and output shaft.

5. The apparatus of claim 3, wherein said output shaft includes a flywheel installed therein.

* * * * *